C. E. STAILEY AND E. H. BLAZER.
WHEEL.
APPLICATION FILED NOV. 26, 1919.
1,393,711.
Patented Oct. 11, 1921.
2 SHEETS—SHEET 1.
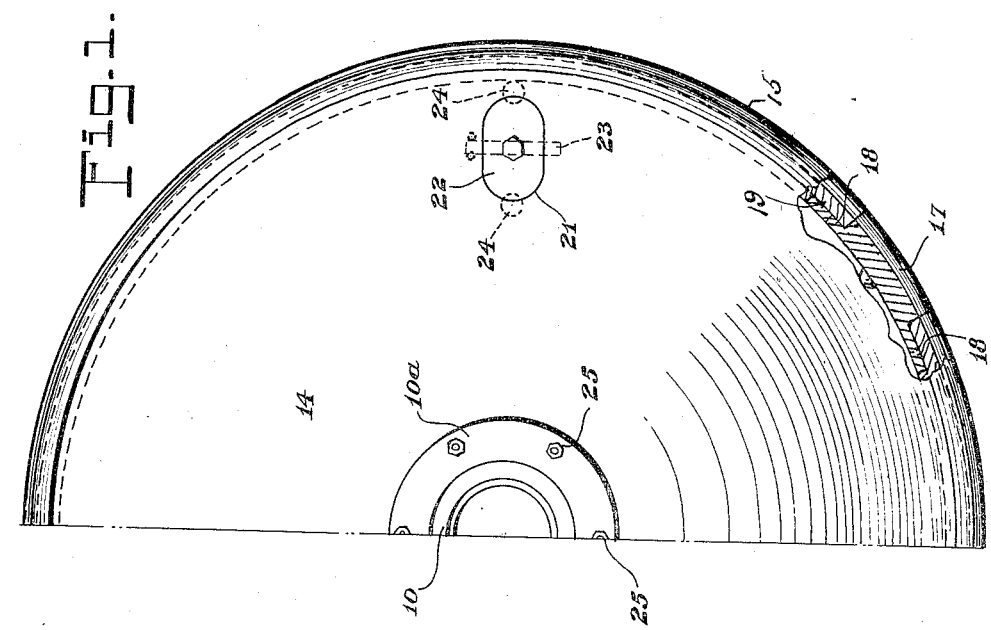
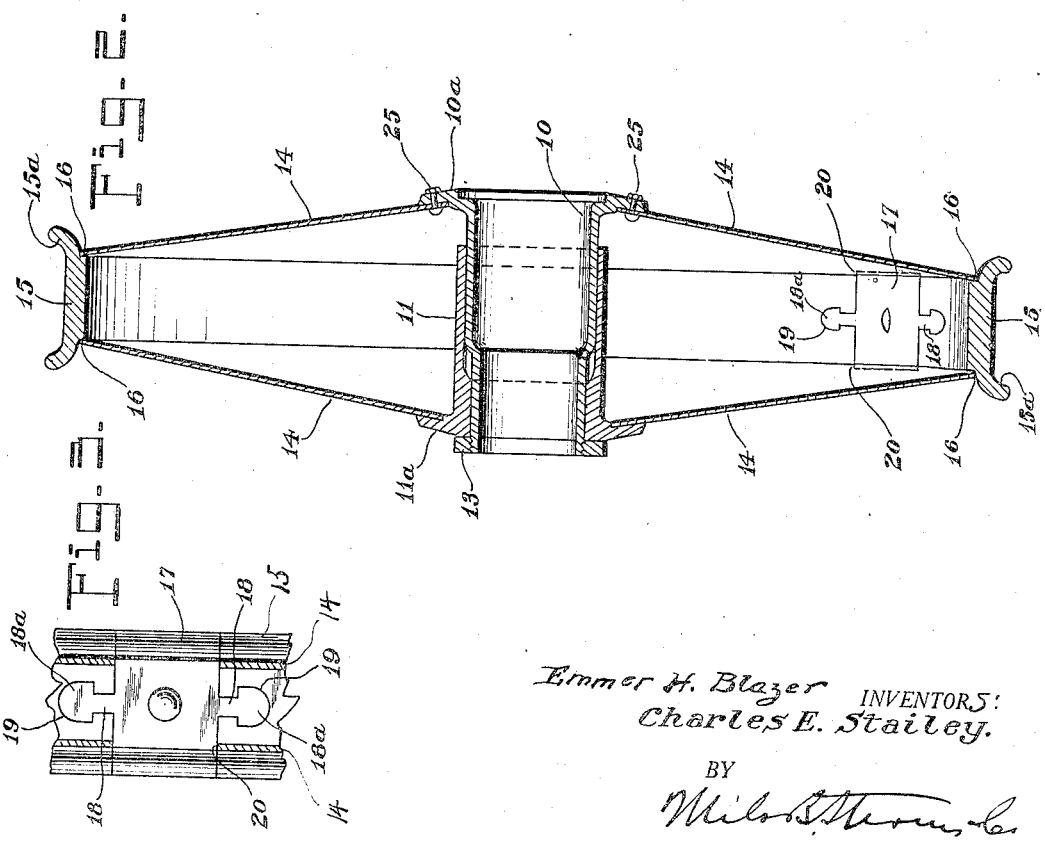
Emmer H. Blazer
Charles E. Stailey.
INVENTORS
BY
ATTORNEY.

C. E. STAILEY AND E. H. BLAZER.
WHEEL.
APPLICATION FILED NOV. 26, 1919.
1,393,711.
Patented Oct. 11, 1921.
2 SHEETS—SHEET 2.
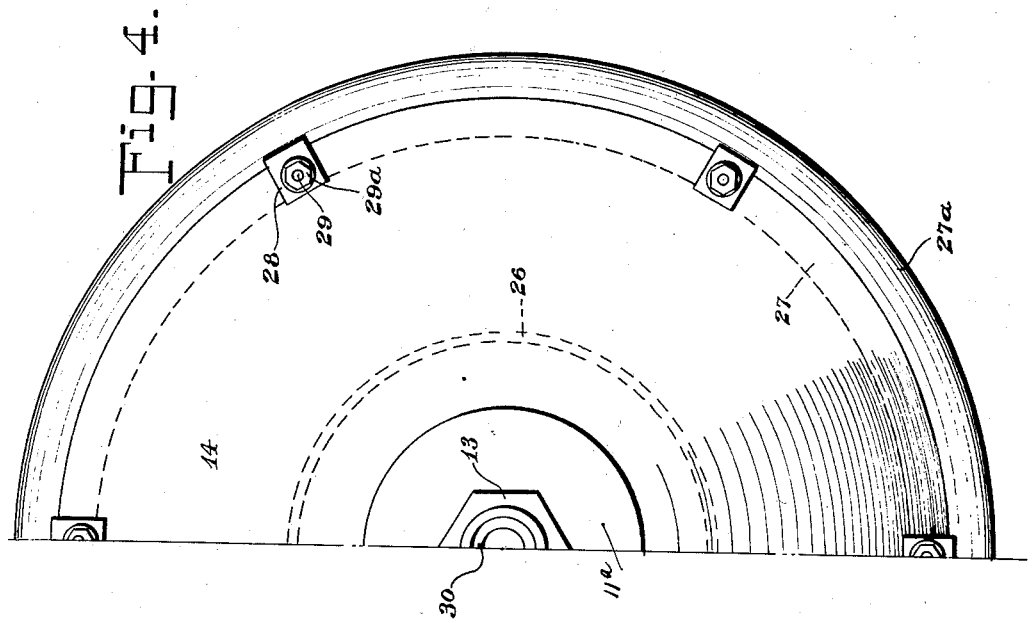
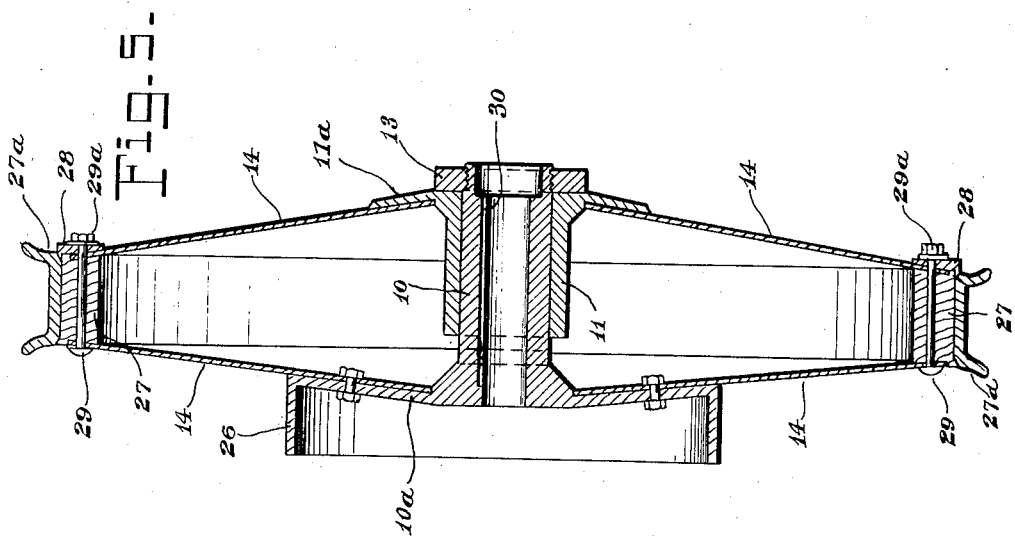
Emmer H. Blazer
Charles E. Stailey.
INVENTORS:
BY
ATTORNEY.

UNITED STATES PATENT OFFICE.

CHARLES E. STAILEY AND EMMER H. BLAZER, OF PORTSMOUTH, OHIO.

WHEEL.

1,393,711.  Specification of Letters Patent.  Patented Oct. 11, 1921.

Application filed November 26, 1919. Serial No. 340,889.

*To all whom it may concern:*

Be it known that we, CHARLES E. STAILEY and EMMER H. BLAZER, both citizens of the United States, residing at Portsmouth, in the county of Scioto and State of Ohio, have invented new and useful Improvements in Wheels, of which the following is a specification.

This invention relates to wheels which are composed of a hub, a rim, and metallic disks held between said hub and rim, no spokes being employed in the structure.

The invention has for its object to provide a strong and light wheel of the kind stated, and also one in which the parts are so constructed and arranged that they can be readily assembled.

The invention also has for its object to provide a wheel which may be equipped with a pneumatic or other tire, the tire supporting means being constructed and arranged so that tire changes can be readily made.

With the objects stated in view, the invention consists in a novel combination and arrangement of parts to be hereinafter described and claimed, and in order that the same may be better understood, reference is had to the accompanying drawings forming a part of this specification.

In the drawings,

Figure 1 is an elevation of one half of the wheel;

Fig. 2 is a vertical section of the wheel;

Fig. 3 is a plan view showing a detachable portion of the rim;

Fig. 4 is an elevation of one half of a modified form of wheel, and

Fig. 5 is a vertical section thereof.

Referring specifically to the drawings, the hub of the wheel is composed of two telescopically connected, sleeve-like members 10 and 11. The member 10 has an end flange 10ª, and the member 11 has an end flange 11ª. The member 10 seats inside the member 11 and projects from the flanged end thereof a sufficient distance to take a nut 13, said projecting end being screw-threaded. When the two members are properly assembled, the flanges thereof are spaced in the direction of the length of the hub.

On the hub seat two metal disks 14, the same having central apertures so that they may be slipped over the outer hub member 11 to seat between the flanges 10ª and 11ª, one flange bearing on the outer face of one disk, and the other flange on the outer face of the other disk, and then by running the nut 13 against the flange 11ª, the parts are held in assembled relation. These disks take the place of the spokes employed in ordinary wheels. The flanged end of the hub member 10 projects a short distance from the inner end of the hub member 11 to seat one of the disks, the other disk seating on the hub member 11.

The rim of the wheel is shown at 15, the same being formed with a channel 15ª to seat a pneumatic or other tire (not shown). The rim therefore serves also as a tire supporting rim, and as it is removable from the wheel in a manner to be presently described, a wheel of the demountable-rim type is produced. The channel may be of the straight side, clencher, universal or any other type according to the kind of tire it is to carry.

On the under side of the rim 15 are side shoulders 16 against which the disks 14 seat, these shoulders being spaced to hold the disks spaced apart at the rim.

It will be noted that the disks 14 are dished, and hence when the nut 13 is tightened up to bring central or hub portions of the disks closer together, their edge portions engaging the rim are forced outwardly and tightly jammed against the latter. The strain thus placed on the disks also so stiffens them that the wheel is given sufficient strength and rigidity to carry heavy loads notwithstanding the light weight of the disks.

The rim 15 is provided with a short removable portion 17, so that it may be contracted to facilitate removal and mounting of the tire. On the under side of this movable portion, at the ends thereof, are projecting wings 18 having heads or enlargements 18ª at their extremities, and the bottom of the adjacent portions of the rim has recesses 19 which are shaped to seat said wings. No other retaining means for the inserted portion 17 are necessary, as the disks 14 engage it in the same manner as they engage the rim and thus prevent inward and lateral displacement. Outward displacement is impossible as the recesses 19 do not extend completely through the rim. The under side of the part 17 is slightly wider than the rim at the under side thereof, and the disks have peripheral notches 20 to seat the former. This also prevents relative rotation of the disks and the rim.

One of the disks 14 has an opening 21 in order that access to the valve stem of the tire may be had, and this opening is provided with a cover plate 22 provided with a suitable latch 23. Stop lugs 24 on the edge of the opening in the disk prevent the cover plate from dropping through the opening.

The flange 10ª of the hub member 10 is bolted to the disk 14 on this side of the wheel, as shown at 25, it being understood that this is the inner side of the wheel.

For the hind or drive wheels of motor vehicles, the flange 10ª can be made larger and formed with an outstanding peripheral rim 26 to serve as a brake drum, as shown in Fig. 5. The tire can be removed from this wheel by taking off the outer disk 14 or the demountable rim if a rim of that type is used.

Fig. 5 shows a rim construction designed for wheels carrying heavy loads, such as truck wheels, tractors, etc. Here the rim is composed of an inner section 27 and a demountable outer section 27ª. The rim section 27ª is secured by wedge lugs 28 carried by bolts 29 and secured by nuts 29ª. These bolts pass through the rim section 27 and also through the disks 14.

In the various embodiments of the invention hereinbefore described, the hub member 10 will be designed according to the place where the wheel is used. Thus, Fig. 5 shows this hub member provided with a keyway 30 so that it may be keyed on the drive axle of a motor vehicle. In a wheel for an axle of the floating type, the hub member 10 will be correspondingly modified.

Fig. 2 shows a hub member 10 for the front wheel of a motor vehicle.

The invention is shown applied to a vehicle wheel, but the disk construction can also be applied to belt pulleys.

We claim:

1. A wheel comprising a hub, a pair of laterally spaced disks through which the hub extends, and a rim encircling the periphery of the disks and having side shoulders engageable by the latter, said rim having a gap and a section removably mounted in said gap, the aforesaid disks having peripheral notches in which bottom portions of said section seat, and said section having projecting wings at its ends, and the rim having recesses in its inner surface at the ends of the gap in which the side wings seat.

2. A wheel comprising a hub composed of a pair of telescopically and slidably connected sections having end flanges, one of said sections projecting from the flanged end of the other section and having its projecting end screw-threaded, a pair of laterally spaced and dished resilient disks having central apertures through which the hub passes, said apertured portions of the disks being located inside the aforesaid flanges and engageable thereby, a rim encircling the disks, and a nut screwed on the aforesaid screw-threaded projecting hub section and engageable with the adjacent end of the other section for contracting the hub sections and the central portions of the disk to place the latter under compression.

In testimony whereof we affix our signatures.

CHARLES E. STAILEY.
EMMER H. BLAZER.